United States Patent
Tanner

(10) Patent No.: US 7,430,158 B1
(45) Date of Patent: Sep. 30, 2008

(54) MUSIC PLAYER WITH ADJUSTABLE PITCH CONTROLLER

(76) Inventor: Chris Tanner, 861 Corporate Dr., Suite 201, Lexington, KY (US) 40503

( * ) Notice: Subject to any disclaimer, the term of this patent is extended or adjusted under 35 U.S.C. 154(b) by 795 days.

(21) Appl. No.: 11/009,746

(22) Filed: Dec. 13, 2004

(51) Int. Cl.
G11B 5/09 (2006.01)

(52) U.S. Cl. .................. 369/59.19; 369/59.1; 369/47.48

(58) Field of Classification Search .................. None
See application file for complete search history.

(56) References Cited

U.S. PATENT DOCUMENTS

| | | |
|---|---|---|
| 4,726,007 A | 2/1988 | McCormack |
| 4,780,772 A | 10/1988 | Shibuya et al. |
| 5,059,126 A | 10/1991 | Kimball |
| 5,159,141 A | 10/1992 | Iba |
| 5,253,085 A | 10/1993 | Maruo et al. |
| 5,313,011 A | 5/1994 | Koguchi |
| 5,677,995 A | 10/1997 | Mager |
| 5,737,303 A | 4/1998 | Stetter |
| 5,739,994 A | 4/1998 | Ottesen et al. |
| 5,757,238 A | 5/1998 | Ferraiolo et al. |
| 5,764,430 A | 6/1998 | Ottesen et al. |
| 5,768,298 A | 6/1998 | Nagai et al. |
| 5,787,292 A | 7/1998 | Ottesen et al. |
| 5,793,739 A | 8/1998 | Tanaka et al. |
| 5,889,418 A | 3/1999 | Kim |
| 5,898,650 A | 4/1999 | Porsbo et al. |
| 5,958,650 A | 9/1999 | Wolleb et al. |
| 5,962,657 A | 10/1999 | Wolleb et al. |
| 5,974,581 A | 10/1999 | Nagai et al. |
| 5,983,387 A | 11/1999 | Nagai et al. |
| 5,995,462 A | 11/1999 | Harold-Barry |
| 6,067,203 A | 5/2000 | Ottesen et al. |
| 6,076,184 A | 6/2000 | Nagai et al. |
| 6,078,670 A | 6/2000 | Beyer |
| 6,175,632 B1 | 1/2001 | Marx |
| 6,177,775 B1 | 1/2001 | Bruington et al. |
| 6,233,210 B1 | 5/2001 | Schell |
| 6,246,650 B1 | 6/2001 | Kuroiwa |
| 6,269,061 B1 | 7/2001 | Shimizume et al. |
| 6,276,612 B1 | 8/2001 | Hall |
| 6,300,553 B2 | 10/2001 | Kumamoto et al. |
| 6,314,542 B1 | 11/2001 | Nagai et al. |
| 6,356,127 B1 | 3/2002 | Klipper et al. |
| 6,591,175 B2 | 7/2003 | Numata et al. |
| 6,656,137 B1 | 12/2003 | Tyldsley et al. |
| 6,690,391 B1 | 2/2004 | Proehl et al. |
| 6,704,382 B1 | 3/2004 | Metzler et al. |
| 2003/0118158 A1 | 6/2003 | Hattori |
| 2005/0111319 A1* | 5/2005 | Usui et al. .............. 369/47.28 |
| 2006/0107822 A1* | 5/2006 | Bowen .................. 84/612 |

OTHER PUBLICATIONS

Michael Gwertzman, "With a Nod to Vinyl, CD's Take Over the Turntable", The New York Times Company, Sep. 23, 2004.

* cited by examiner

*Primary Examiner*—Muhammad N. Edun
(74) *Attorney, Agent, or Firm*—Chris Tanner

(57) ABSTRACT

A media player having variable pitch is disclosed. The player incorporates a memory buffer that is responsive to a user-designated pitch adjustment. The result is that a user can manually control and adjust the pitch of prerecorded CDs and MP3s or other digital media in an "on-the-fly" environment.

16 Claims, 12 Drawing Sheets

MUSIC PLAYER WITH ADJUSTABLE PITCH CONTROLLER

FIELD OF THE INVENTION

This invention relates generally to music players, and more specifically to a CD or MP3 player which allows a user to adjust the pitch of the music emanating therefrom.

BACKGROUND OF THE INVENTION

Not all CDs and MP3s are recorded at perfect pitch, nor do all media players play back at exactly the same frequency. A guitarist can easily adjust an instrument to account for minor deviations in pitch. However, a pianist cannot. Consequently, a CD player which allows a user to make both minor and major adjustments to the pitch is desired.

SUMMARY OF THE INVENTION

It is an object of the present invention that the rate of data read out from a buffer memory is varied, so as to effectuate a pitch change during playback of a CD or MP3 or other digital music file. The intervals at which data is written into the buffer memory are varied to effectuate a reproduction timing adjustment. With these features, the pitch of a CD or MP3 can be selectively changed without affecting the rotation control of the spindle motor.

DETAILED DESCRIPTION OF THE PREFERRED EMBODIMENTS

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

Figure 1:
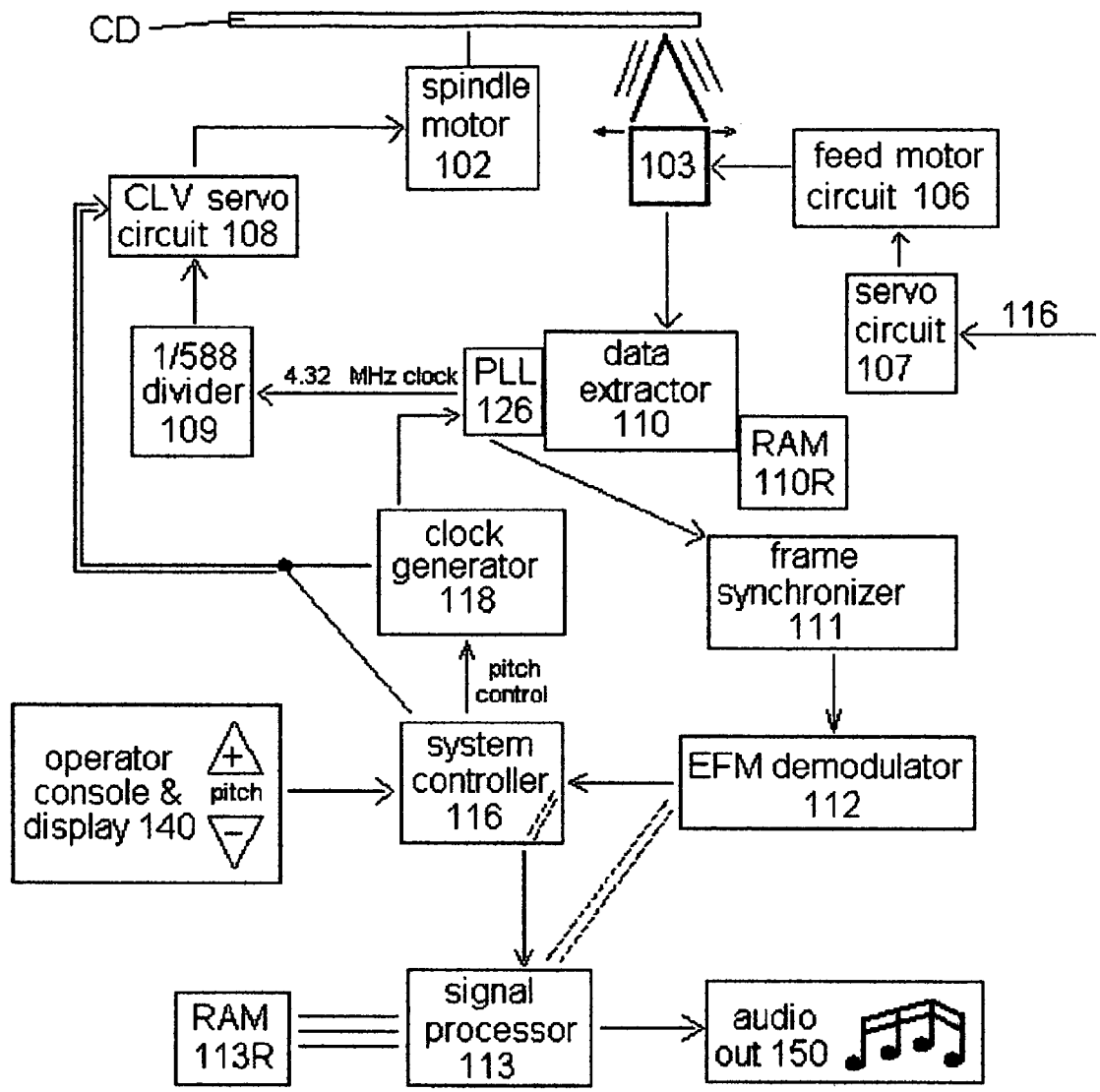
FIG. 1 shows a first embodiment of the present invention for playing CDs.

As shown in FIG. 1, a CD console 140 has two pitch control buttons '+' and '−' for increasing (+) or decreasing (−) pitch speed of a CD. A system controller/CPU 116, e.g. a microprocessor or CPU, controls the CD player 100. The system controller 116 outputs drive control signals to a constant linear velocity (CLV) servo circuit 108, a focus servo circuit 104, and a feed servo circuit 107. The CLV servo circuit 108 assures that the linear velocities of respective tracks of the CD remain constant, by carefully controlling the revolutions of a spindle motor 102.

The focus servo circuit 104 detects a focus error from the state of laser beam reflection, and controls and drives the objective lens in an optical pickup 103 in the optical axis direction based on the detected focus error. The feed servo 107 controls a feed motor 106, which moves the optical pickup 103 in the radial direction of the CD by detecting laser beam differences from the track center of the CD. The servo circuit 107 moves the optical pickup 103 for tracking appropriate tracks when laser beam differences fluctuate rapidly due to the eccentricity of the optical pickup 103. Thus, the servo circuit 107 controls the optical pickup 103 to correctly irradiate laser beams to the track center of the CD.

During playback, the surface of the CD is irradiated by laser beams. The CD has extrusions called pits which contain digital signals. The optical pickup 103 detects the existence of these pits based on the luminous energies of the reflections of irradiated laser beams. The pickup 103 reads the existence, length, and positioning of those pits, and inputs that information to a data extractor 110.

The musical data is stored read from the CD as a series of pulses. Since the widths of these pulses range from 3 to 11 clock cycles, when the pulses are differentiated sometimes discontinuous pulse series' occur (unwanted). Accordingly, bit clocks within the musical data are extracted by converting the pulses into continuous pulse series using a phase locked loop (PLL) 126 for aligning and input clock with a reference clock, shown in FIG. 1 adjoining the data extraction circuit 110.

Figure 6:
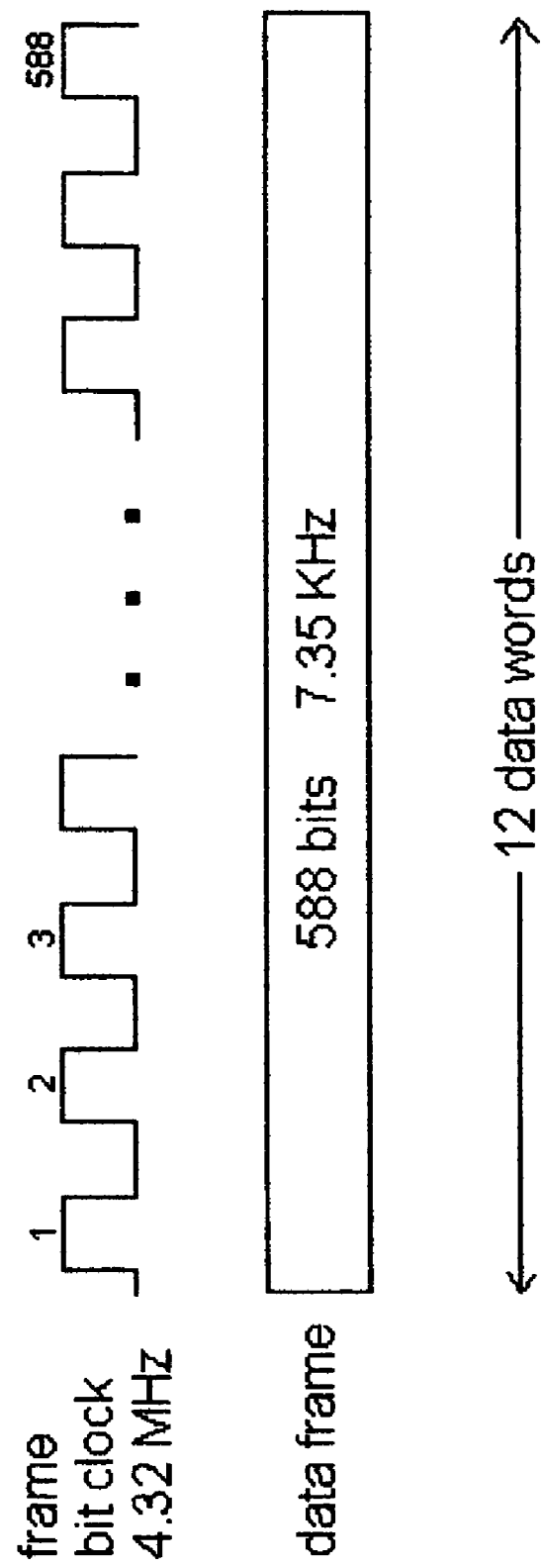
FIG. 6 shows the time of how a frame of data is read.

The following is a description of a typical CD frame format. A frame of a CD signal comprises 588 bits of data. The lead 24 bits in the respective frames are reserved for frame synchronizing signals. In CDs, each frame contains twelve (12) data words. Accordingly, to read or sample one frame takes time of $6/f_s$ (sec), where $f_s$ is a sampling frequency. This time corresponds to a frequency of 7.35 KHz. Since a typical CD frame contains 588 bits of data, the bit clocks in CD reproduction signals are customarily set at 4.321 MHz (==7.35 KHz multiplied by 588) when the CD is played at the normal speed. FIG. 6 shows the frequency correspondence between the recorded and reproduced signals of a CD according to the present invention.

Referring back to FIG. 1, the data extractor 110 extracts the above described bit clocks by digitizing the reproduction signals into binary values, and transmitting the bit clocks to a divider 109, a frame synchronizer 111, and a demodulator 112. The data extractor 110 also outputs digitized reproduction signals to the frame synchronizer 111, which detects a frame synchronization signal from the data extractor 110 and outputs the data being cut off at every frame to the demodulator 112 using the detected frame signal.

When the optical pickup 103 converts data from the pits on the CD into electric signals, if either of a logical "1" or "0" continues sufficiently long, the electrical signal can become like a DC signal, so that important bit spacing information is interrupted or misplaced. This in turn causes the focus servo circuit 104 to operate erroneously, which adversely affects the behavior of the optical pickup 103.

To eliminate such a DC signal, a data conversion method called the EFM [Eight (8) to Fourteen (14) Modulation] is employed, whereby the 8-bit data recorded in a CD is converted to 14-bit digital data. This conversion is completed so as to avoid a potential long continuation of a logical 1 or 0.

The EFM demodulator 112 demodulates EFM 14-bit data converted from the reproduction signals back to the original 8-bit data.

The 8-bit audio data is then inputted to a signal processing circuit 113 are inputted to the system controlling circuit 116. The signal processing circuit 113 corrects their errors based on an error correction protocol called the CIRC (Cross Interleave Reed-Solomon Code). The signal processor 113 is responsive to the clock signals from the clock generator 118, as well as to the controller/CPU 116. The controller 116 manages the dataflow between the EFM demodulator 112 and signal processor 113. In some cases the controller 116 manages the packaging of data frames coming out of the EFM demodulator 112 to the processor 113. In other cases the controller 116 allows the demodulator 112 and processor 113 to communicate directly, and exchange high volumes of data in burst mode.

Figure 2:
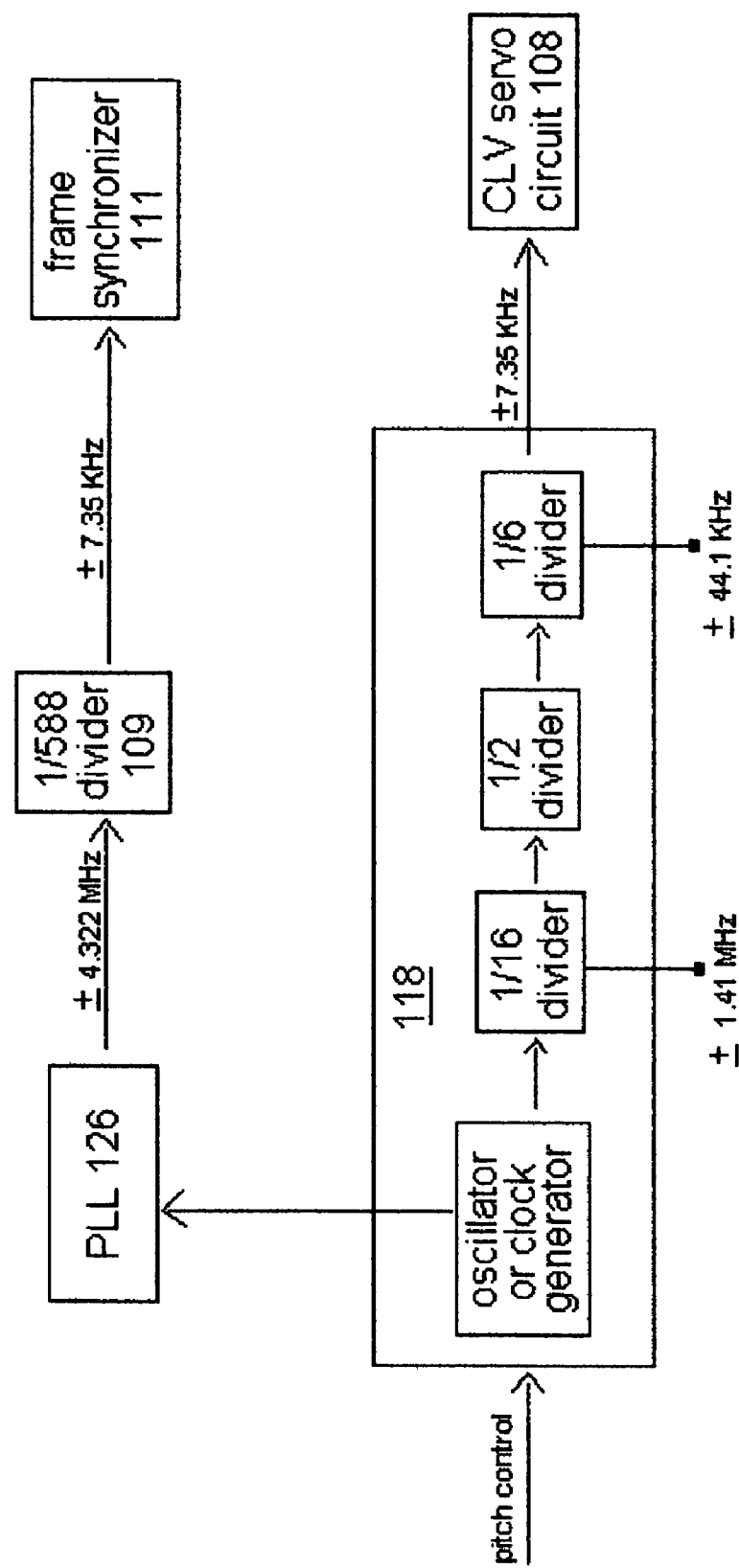
FIG. 2 shows a detailed view of portions of FIG. 1.

In FIG. 2, the clock generator 118 contains dividing circuits 1/16, 1/2, and 1/6 for sequentially dividing the oscillating frequencies of an oscillator 118 by integers. A clock of 44.1 KHz is used for reading in D/A conversion, while a clock of 7.35 KHz is used for the CLV servo circuit 108. The above frequencies are changed according to variations in the pitch signal from the console 140.

Figure 3:
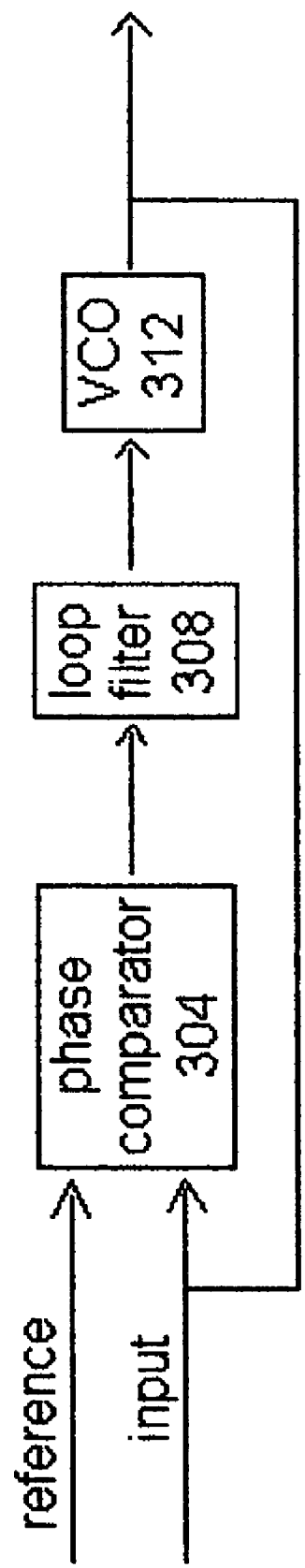
FIG. 3 shows a detailed view of a first embodiment of the PLL of FIG. 1.

As shown in FIG. 3, a first embodiment of the PLL 126 comprises a phase comparator 124, a voltage controlled oscillator (VCO) 125, and a loop filter LF. Usually, the lock range of a PLL is in the magnitude of a few percent of the frequencies inputted to a phase comparator. When these input frequencies are changed, the frequencies outputted from the PLL are correspondingly changed also. Accordingly, the output frequency of the PLL 126 of the present invention can also be freely changed by changing the input frequency yet still remain locked. Accordingly, the CD reproduction speed can be freely changed (within a predetermined range) while the PLL 126 still remains locked. The frequency at which the PLL 126 operates is dependent upon the frequency of the VCO 312 and the loop filter 308. To change the output frequency, these elements must be adjusted. However, adjusting these elements while the PLL 126 is operating can cause the phase lock to be lost for a short period of time.

Another problem particular to digital signal processing is the need to extract a digital clock from a data stream. Though the expected data rate of the data stream may be known, the actual data rate and signal quality received may vary significantly and in some cases may drop out altogether, such as when the CD player gets bumped. Factors that also could affect the frequency and quality of the data stream include imperfections in the detection and decoding equipment, among other things.

Figure 4:
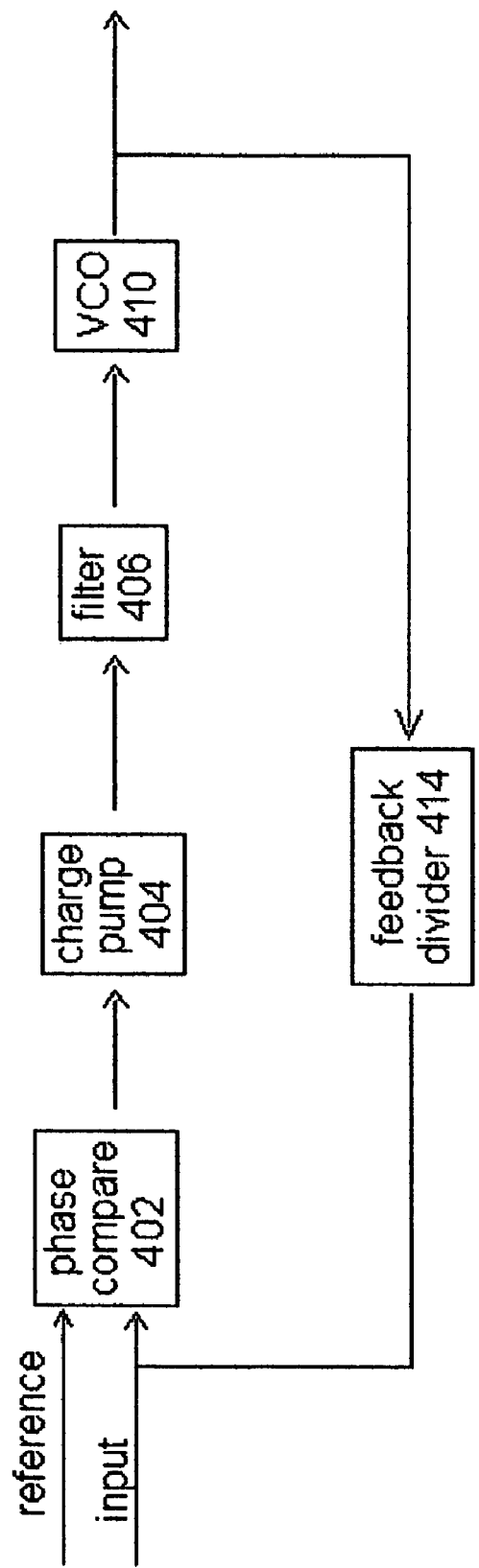
FIG. 4 shows a detailed view of a second embodiment of the PLL of FIG. 1.

To address these problems, FIG. 4 shows a second embodiment of the PLL 126, having a high-speed phase comparator 402, charge pump 404, filter 406, VCO 410, and feedback divider 414. The phase comparator 402 compares an input signal to a feedback signal from the feedback divider 414. Depending on the phase difference between the input and reference clocks, the phase comparator 402 drives the charge pump 404, the output of which is used to drive the VCO 410. The VCO 410 receives a voltage and then outputs a signal with a frequency proportional to that voltage. The output of the VCO 410 is fed back through a feedback divider 414 to a phase comparator 402.

Although FIG. 2 shows frequency dividers within the clock generator 118, the feedback divider 414 has a separate purpose. The divider 414 divides down the PLL output frequency to match the PLL input signal frequency so that their phases can be compared. The signal path through the feedback divider 414 to the phase comparator 402 creates the feedback that facilitates the PLL operations. Because the phase comparator 402 operates at high speed, the time where the output frequency is not locked is very short and does not impact performance.

Figure 5:
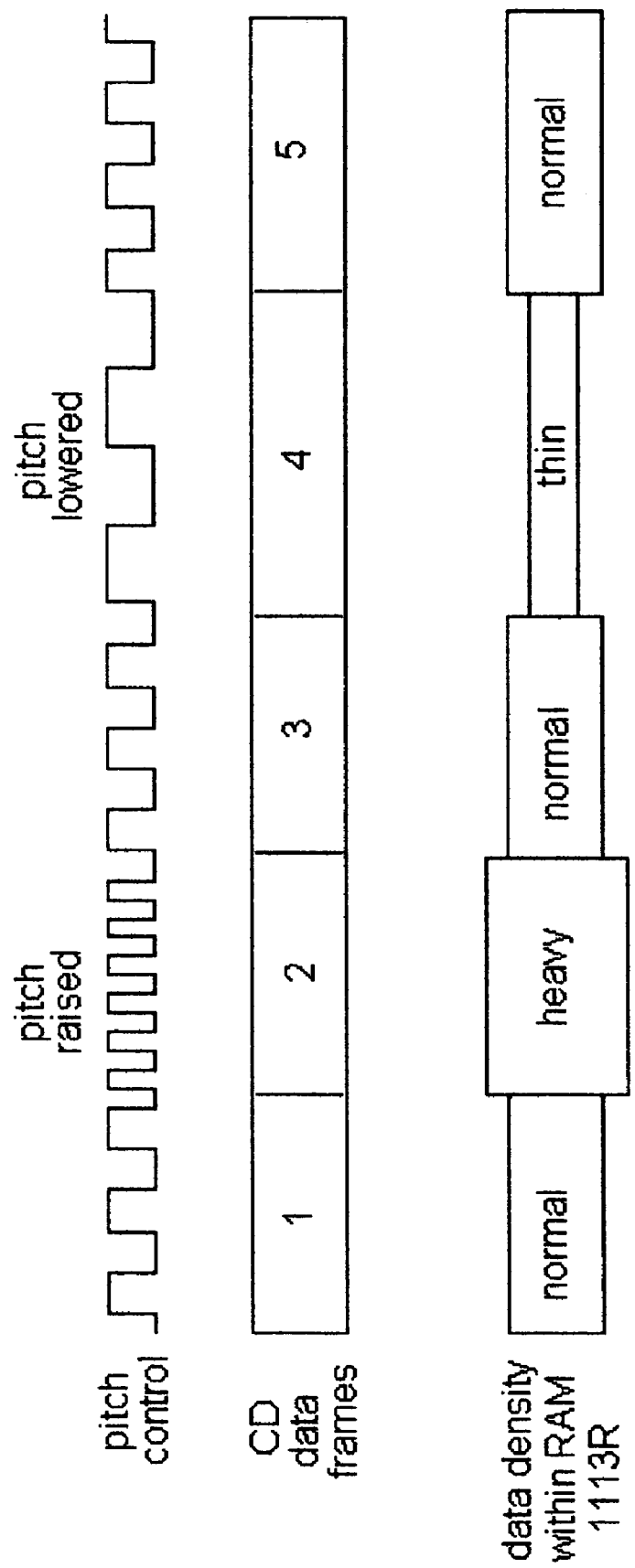
FIG. 5 shows how data density varies based on user pitch adjustment.

FIG. 5 is timing chart showing some exemplary rates of operation of the CD player 100 of the present invention, wherein portions of musical data are selectively raised an octave and lowered an octave in pitch. This range is chosen because a doubling in frequency of a tone will raise that tone once octave, while halving a frequency of a tone will lower that tone one octave. Also, an explanation of the memory buffering performed by data extractor 110 and associated memory 110R is made conceptually easier to understand by using examples of larger proportion.

In normal playback, data frame 1 is read out from the CD at a transfer rate of 1.4 Mb/s for example, and is written into the buffer memory 10 after demodulation. This data is then successively read out from the memory 10 at a transfer rate of 0.3 Mb/s. Then, the data, after sound expansion, is output as playback data signals at a transfer rate of 1.4 Mb/s.

However, for readout of the data frame 2, the clock generator 118 supplies the data extractor 110 and sound expansion signal processor 113 with clock pulses having twice the frequency of normal reproduction. Thus, data is read out from the buffer memory 110R at a transfer rate of 0.6 Mb/s instead of the normal unaltered mode of 0.3 Mb/s. The data is then output from the sound compression/expansion section 12 at a transfer rate of 2.8 Mb/s instead of the normal unaltered rate of 1.4 Mb/s as shown in FIG. 5 by the data portion 2 being drawn fatter and thicker (signifying higher data density). In both cases the transfer rates are two times higher than the normal rate. The sampling frequency of read data portion 2 is 88.2 kHz, which is two times higher than the normal, and hence this portion 2 is drawn thicker and will be reproduced one octave higher in pitch.

The data extractor 110 monitors the changing data storage or accumulation amount (current data balance) in the buffer memory 110R. When the data accumulation has progressed to reach near the last address in the memory 110R, the data extractor 110 instructs readout of a next data portion. Before the data storage progresses to near the last address, the data extractor 110 causes the data readout process to wait or delay. Therefore, as the data is read out from the buffer memory 110R two times faster than the normal rate, the data accumulation amount in the memory 110R decreases more rapidly, so that the waiting time between data frames 2 and 3 becomes shorter than in normal audio playback. In other words, the data writing period in which the demodulated readout data from the CD is intermittently written into the buffer memory 110R does not occur at the normal transfer rate of 1.4 Mb/s, but instead at 2.8 Mb/s. More specifically, the data writing period is shortened so that the writing time is greater than the waiting time in terms of write/wait duty ratio. Finally, in FIG. 5 the normal pitch reproduction is resumed at data frame 3.

FIG. 5 also shows playing back of digital musical data from a CD where that data is lowered in pitch. The operation for data frames 1, 3, and 5 are the same as in normal non-adjusted reproduction. However, for data frame 4, the clock generator 118 supplies the extractor 110 and sound expansion signal processor 113 with clock pulses having 1/2 frequency of normal reproduction. Thus, the data is read out from the buffer memory 110R at a transfer rate of 0.15 Mb/s which is 1/2 the normal rate. Similarly, data is output from the sound expansion section signal processor 113 at a transfer rate of 0.7 Mb/s, which is also 1/2 the normal rate. The data frame 2 is 22.05 kHz which is also 1/2 the normal sampling frequency, hence this read data portion 2 is drawn thinner (lower data density) and will be reproduced in a pitch exactly one octave lower than the other portions.

In this example, because the data is read out from the buffer memory 110R at ½ the normal rate, the data accumulation amount in the memory 110R decreases more slowly than during normal reproduction, so that the waiting time between read data portions 2 and 3 becomes longer than in normal rate reproduction. Normally, the data writing period in which the demodulated readout data from a CD is intermittently written into the buffer memory 110R at a transfer rate of 1.4 Mb/s. In this example however, the data writing period is lengthened so that the writing time is smaller than the waiting time in terms of the write/wait duty ratio.

The system 100 of the present invention can thus achieve pitch change by varying the rate at which data is read out from the CD and then written into the buffer memory 110R.

As stated, conventional PLLs have some limitations. One limitation is that it is difficult to lock to the phase of an input signal having a frequency out of the range onto which a particular PLL is designed to lock, such as the wider frequencies to go up and down entire octaves described above. One solution to this problem is to add a frequency sweep circuit which forces the output frequency of the PLL to sweep across a broader frequency range in an attempt to direct the output PLL frequency to pass close enough to the frequency of the input waveform to enable the PLL to phase-lock.

Figure 7:
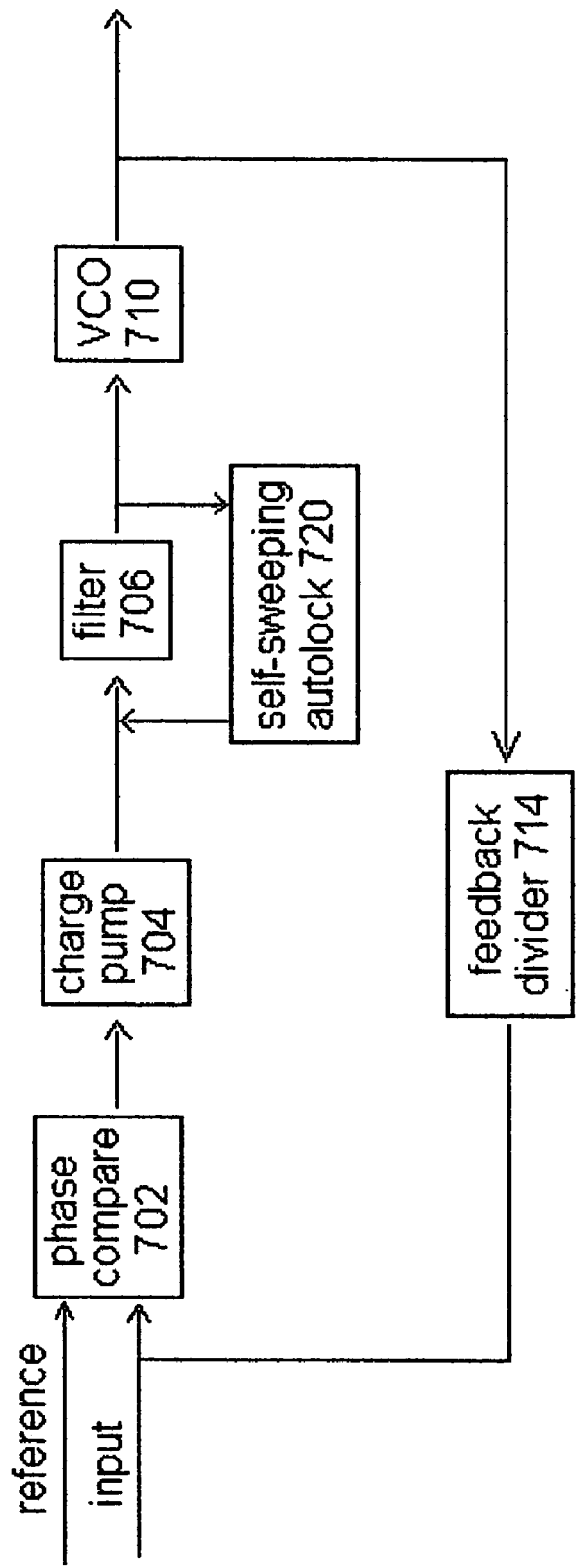
FIG. 7 shows a detailed view of a third embodiment of the PLL of FIG. 1.

Accordingly, a third variation of the PLL 126 is shown in FIG. 7, which shows a data stream arriving at the input of a phase compare 702, which detects the phase difference between a reference clock and a feedback clock which also constitutes the output clock of the PLL 126. The phase compare 702 outputs a phase difference signal representative of the phase difference between the reference and input clocks. The phase difference fed into a charge pump 704 and low pass filter block 706. The charge pump 704 and low pass filter block 706 convert the digital phase difference signal into an analog phase difference signal through a D/A converter. The analog phase difference signal is then fed through a low pass filter to filter out high frequency noise.

A filtered analog phase difference signal is output from the charge pump 704 and low pass filter 706 in a feed-back loop to a self-sweeping autolock sub-circuit ("SSA") 720. The SSA 720 determines whether the PLL 126 has lost phase lock by calculating the value of the control voltage signal based on the phase difference signal.

Phase lock is lost by the PLL 126 when the frequency between the input and reference clocks exceeds a predetermined maximum frequency difference. The SSA 720 receives the control signal and identifies the phase difference between input and reference clocks. If the value of the control signal is outside the range of acceptable values, the SSA 720 determines that phase lock is absent. When phase lock is lost, the SSA 720 enters a mode in which it outputs a phase search signal which sweeps the input at a predetermined range of frequencies. In the absence of phase lock, the SSA 720 varies the control voltage signal in a sweeping manner across a predefined range of frequencies. The sweeping operation continues in a repetitive manner until phase lock is re-acquired.

The present invention also has an embodiment which can scale back the amount and granularity of frequency shifting that it performs, which is useful in those environments where only a minor amount of re-tuning is required. As stated earlier, the clock signal frequency of 7.35 KHz supplied to the CLV servo circuit 108 shown in FIG. 2 is customarily used during CD playback. Each time one of the pitch control buttons on the console 140 is pressed, the system controlling circuit 116 outputs an adjusted pitch control signal so that the frequency of the clock signal generating circuit 118 changes by a semitone, i.e. in the ratio of $2^{1/12}$ (~=1.059) Hz. When the frequencies of the clock signal generating circuit 118 are changed, the frequencies of the bit clock signals signal processing circuit 113 are also changed by the same ratio, i.e. $2^{1/12}$. Thus, the pitches and the tempos of the digital musical data played out from the CD are similarly changed. Such frequency changes are realized by controlling the oscillator 118 with the user-selected pitch signal as shown in FIG. 2. The console 140 can also be equipped with options that allow a user to change tunings, such as from the recorded key (i.e. G) to go up one whole step (i.e. the key of A), or perhaps a half-step (G to G#), or perhaps a smaller deviation. Such an adjustability could be useful to musicians who are attempting to learn a song by playing along with that song, yet have difficulty quickly tuning their instrument to adjust for minor deviations in pitch that are a common problem among different media players. A piano is one example of such an instrument that cannot be easily re-tuned in any direction, although other instruments have this problem also.

The oscillator 118 can be made from a programmable silicon oscillator, or a ceramic oscillator capable of generating varying oscillating frequencies. Alternately, a software oscillator can be fabricated by taking a timer tick from the overall control microprocessor for the CD unit, or the mini operating system (O/S) loaded thereon. In the case of CD playback units mounted in a personal computer or workstation, the software oscillator can trigger from the timer tick from the O/S running on the computer CPU. Because the average PC runs at frequencies around 1 GHz yet as shown speeds for the present invention do not exceed 4.32 MHz (FIGS. 1 and 2), sufficient bandwidth is available to facilitate accurate clock management as well as sophisticated error detection and correction of the musical data.

Figure 8:
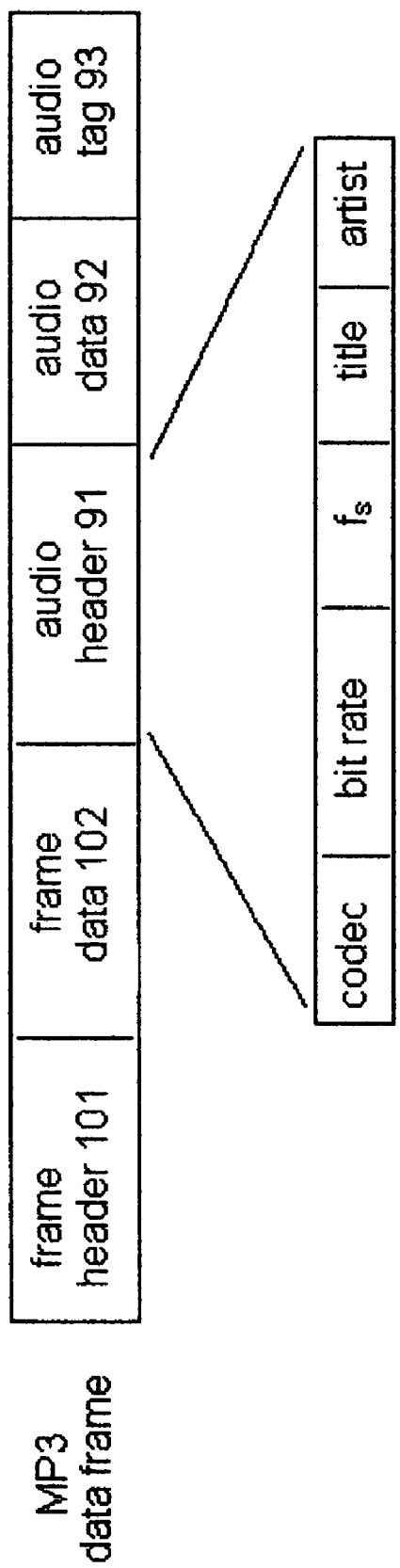
FIG. 8 shows an .MP3 frame format as used within the present invention.

The playback mechanism of the present invention can work from .MP3 files as well as CDs. An exemplary .MP3 file format is shown in FIG. 8, in which an .MP3 file 90 has a header 91, audio data 92, and tag 93. Within the header 91 there is stored codec information, bit rate, sampling frequency, channel mode, song name, artist name, and other content information.

Moreover, within the .MP3 file of FIG. 8, the audio data 92 is partitioned into packet form at to fit within the MPEG audio frame format. This format consists of a frame header 101 and its associate data 102. The header 101 can also contain information regarding the length of the frame.

Figure 9:
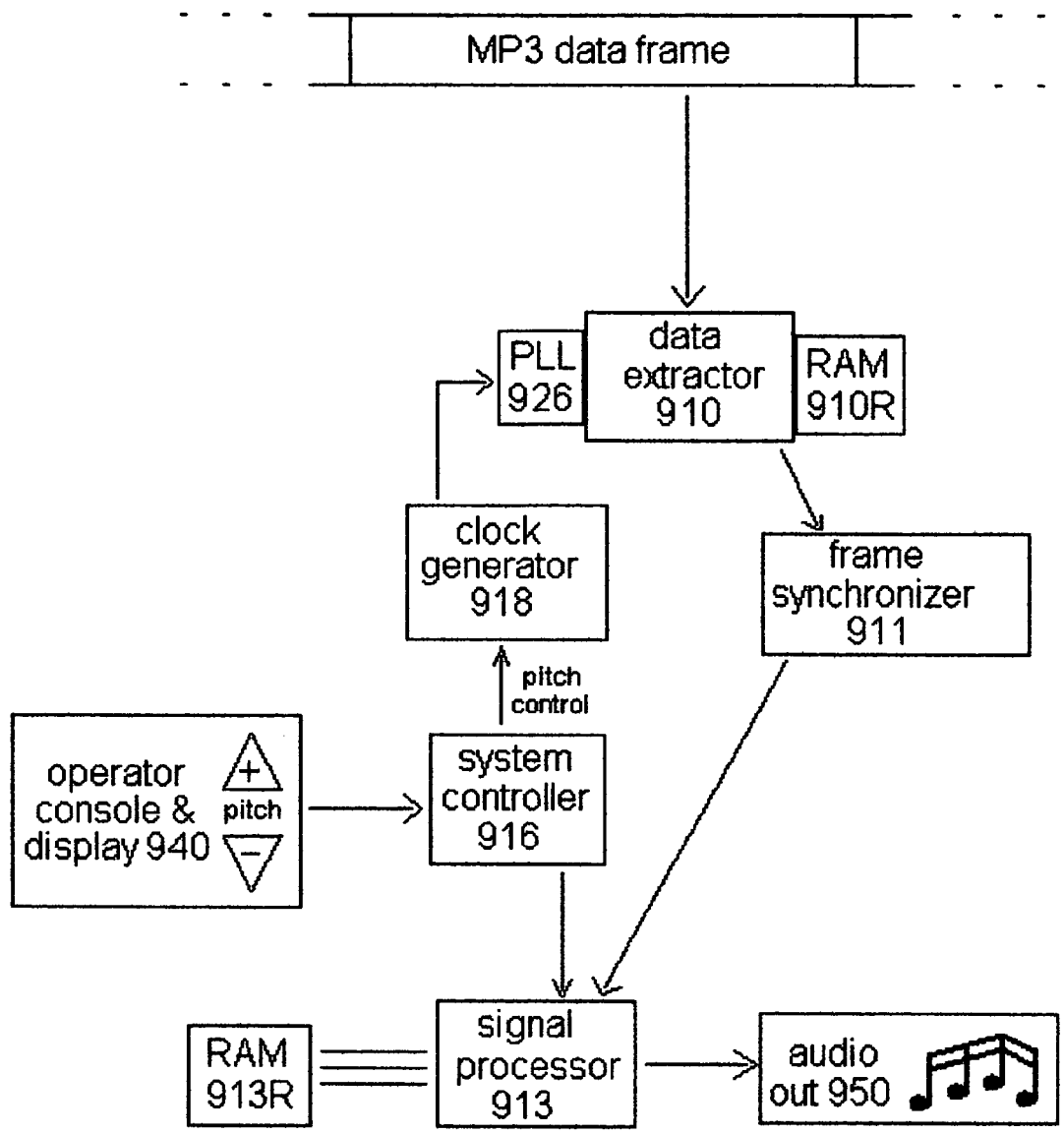
FIG. 9 shows a second embodiment of the present invention for playing .MP3 files.

An exemplary MP3 playback system is shown in FIG. 9, wherein a system controller 116 decodes an MP3 data frame by extracting .MP3 frame data which it passes to a frame synchronizer 911. The frame synchronizer 911 compares total data length and checksum among other things, to determine whether communication is being carried out successfully. A lot of components from FIG. 1 are used similarly in FIG. 9, including the extractor 910, generator 918, synchronizer 911, controller/CPU 916, demodulator 912, and signal processor 913.

Figure 10:
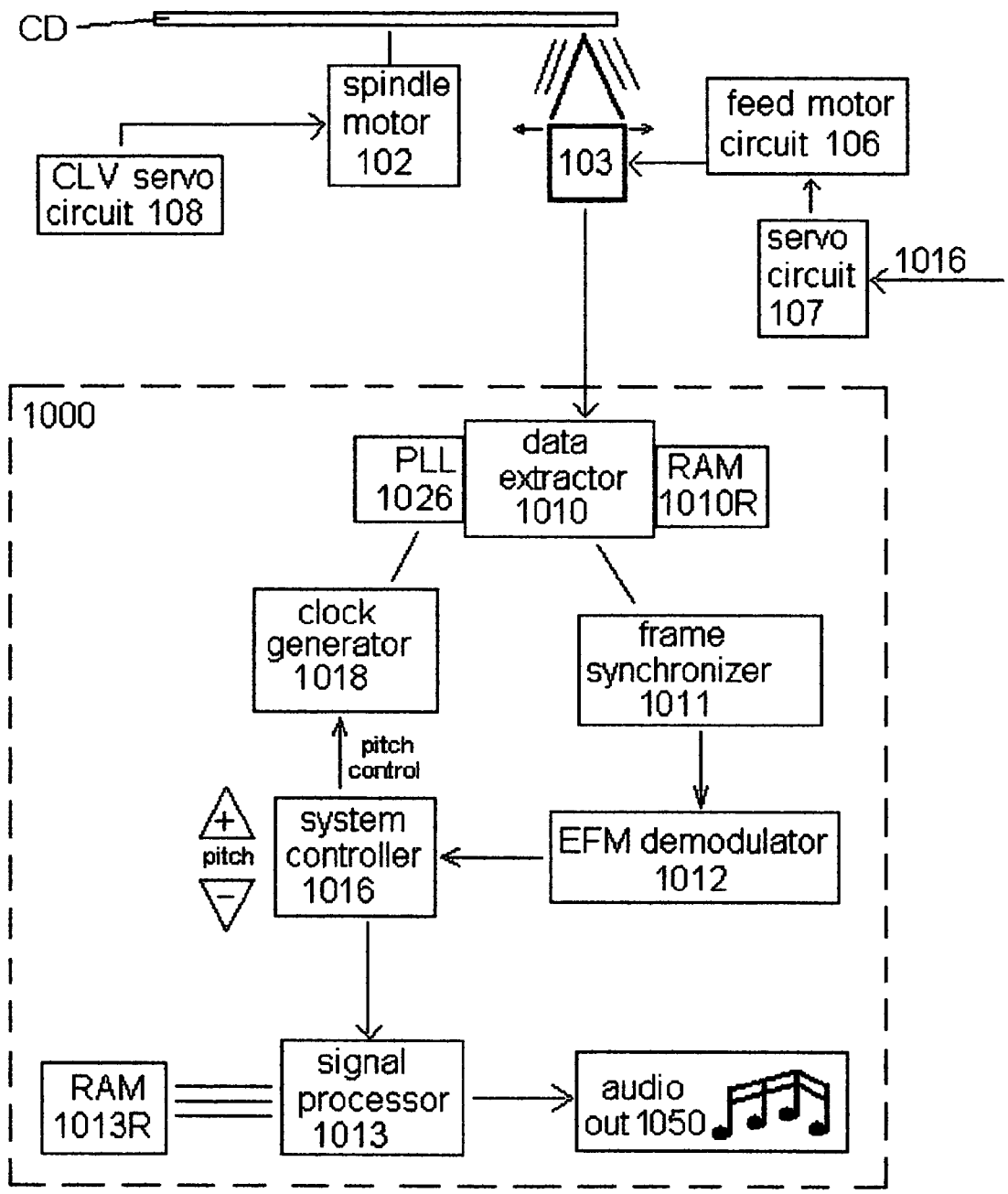
FIG. 10 shows a third software embodiment of the present invention.

FIG. 10 shows a playback system 1000 of the present invention which is implemented partially in software. One example where this would be useful is with a CD or media player that can function within and is sometimes loaded within a Windows™ or other proprietary O/S or even an open-source O/S. In such a case, the playback system 1000 relies on the CD drive hardware only for managing the steady and unvarying rotation of the spindle motor. Within the .MP3 implementation the spindle motor hardware and logic is omitted. The rest of the data management, buffering, and PLL clock synchronizing is contained within the software module 1000 itself, as denoted by the dotted lines in FIG. 10. A lot of components from FIG. 1 are used similarly in FIG. 10, including the extractor 1010, generator 1018, synchronizer 1011, controller/CPU 1016, demodulator 1012, and signal processor 1013.

Figure 11:
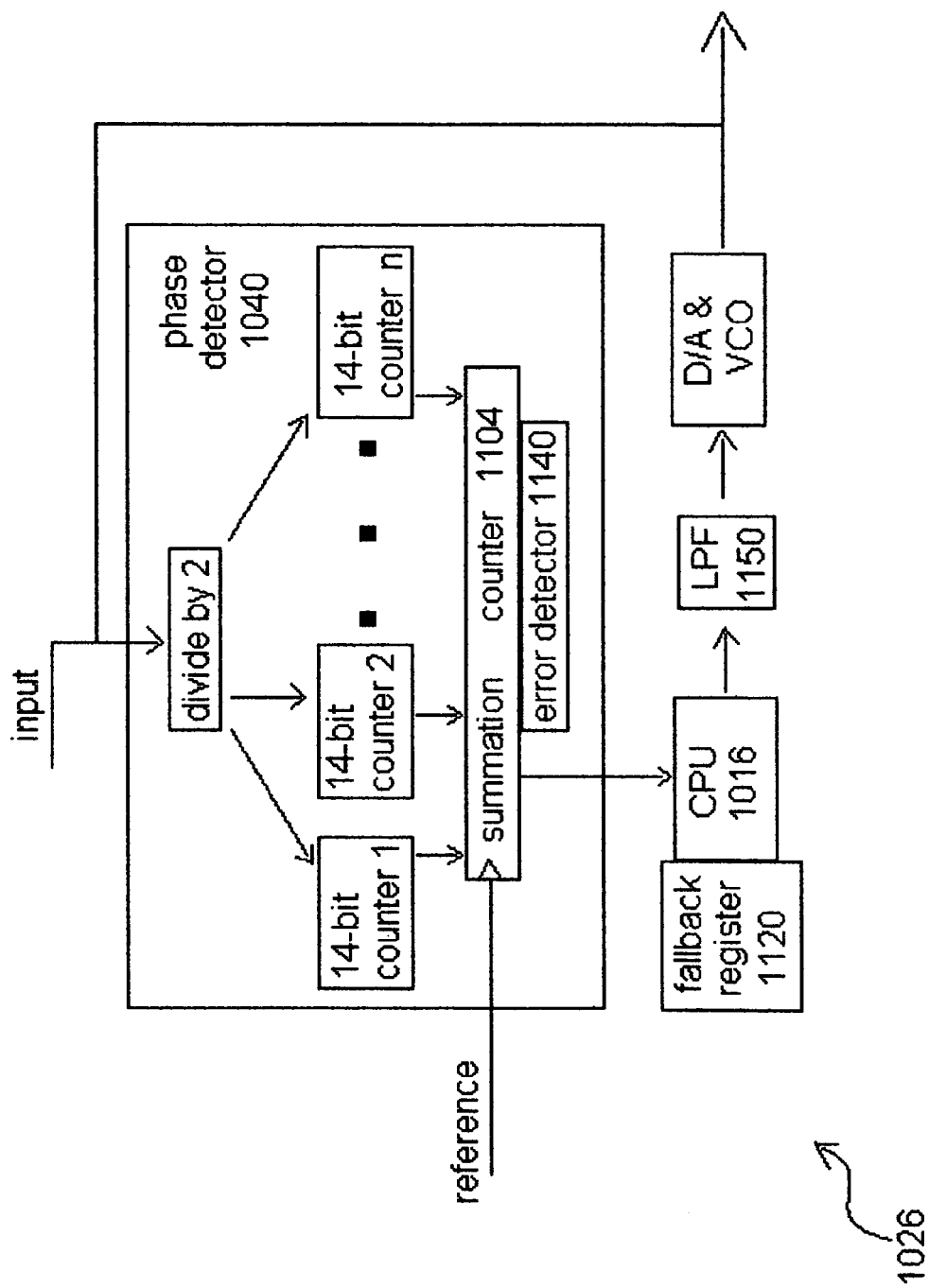
FIG. 11 shows a software embodiment of the PLL of FIG. 10.

The PLL 1026 is also be implemented in software, as shown in FIG. 11. The software implementation of a PLL 1026 allows flexibility in for detecting input signals which are out of expected frequency range, and for detecting failure states in which the PLL cannot properly track the input signal. Checking the counter value to determine if it deviates from previously read counter values by more than a predetermined amount is done to detect whether input signals are out of range. More complex range-checking tests can also be used.

As shown in FIG. 11, the software PLL 1026 comprises a summation counter 1104 which has a read module to periodically read a value from the phase counters 1 . . . n, and a comparison module to compare a current summation counter value to a last of the stored plurality of summation counter values. The software PLL 1026 also includes an error detector 1140 to disable further summation counter reading if the reference clock signal is lost.

In the event of such a loss, holdover at the last known valid clock frequency is implemented as follows. A set of most recent counter values is stored in fallback register 1120 by the CPU 1016, for example the clock values passed to the D/A for the previous 10 seconds. When a clock signal is lost, the software PLL 1026 ignores further counter values, and slowly returns the D/A to the last valid value (so that an abrupt frequency shift at the output does not occur). This value is then kept fixed until a verifiably valid input is detected. Frequency accuracy is then a function only of the intrinsic performance of the VCO and the stability of the D/A output. Filtering algorithm modules responsive to the CPU 1016 can improve or eliminate high frequency jitter.

Figure 12:
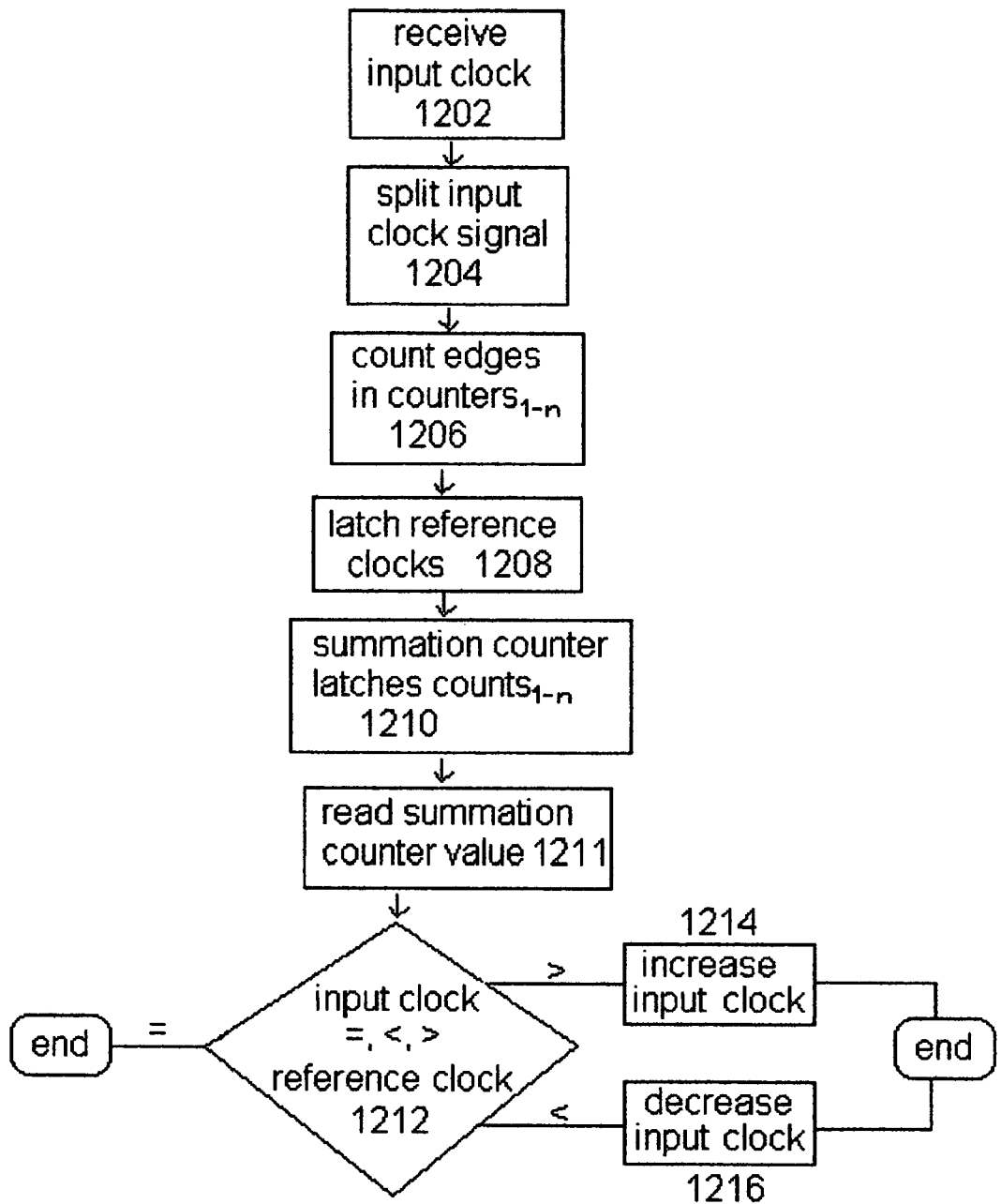
FIG. 12 shows a flowchart explaining the PLL of FIG. 12.

The behavior of the software PLL 1026 is shown in the flowchart diagram of FIG. 12. The first step performed by the software PLL 1026 is receiving a local clock signal (step 1202), and then splitting it into a plurality of phases ranging from 2 to n (step 1204). Once the local clock signal is thus split into the various phases, the rising and the falling edges of each of the phases are counted, each in its own counter (step 1206).

With the local clock signal split into multiple phases, the 14-bit counters (FIG. 11) are used to count the rising and falling edges of each phase. On a predetermined schedule, the reference clock is latched into the summation counter 1104 on a predetermined schedule (step 1208). When this happens, the summation counter 1104 latches counter information from the 14-bit edge counters and sums them together (step 1210). This sum is indicative of the number of edges in the predetermined time period between latches of the reference clock, and is read by the CPU 1016 (block 1211).

In step 1212, the newest counter value from the summation counter 1104 is compared with secondmost recent counter value from the summation counter. If the newest counter value is greater than the secondmost recent counter value, the local input clock is running faster than the reference clock. If the newest counter value is less than the secondmost recent counter value, the local clock is running slower than the reference clock. Over time, a recognizable non-random pattern of steadily increasing or decreasing counter values indicates that the local clock is drifting.

If a pattern of increasing or decreasing counter values is detected so that clock drifting is occurring, then local clock correction is accomplished in blocks 1214 or 1216 depending upon the direction of the clock drift. A software filter processes the values to determine the proper correction to meet precision clocking standards. Adjustment of the output clock to match the reference clock is accomplished once the proper correction has been determined.

However, one-time changes such as those due to high frequency jitter can also affect counter values. To largely eliminate high frequency jitter effects, the counter values read by the CPU can also be filtered through a low pass filter.

It is anticipated that various changes may be made in the arrangement and operation of the system of the present invention without departing from the spirit and scope of the invention, as defined by the following claims.

What is claimed is:

1. A media player having user-selectable variable pitch, comprising:
    a reproduction mechanism; and
    a logic module comprising a data extractor and associated memory buffer that can extract tonal data from said media through said reproduction mechanism, and then operate to adjust said tonal data up or down in pitch according to a pitch signal responsive to user input;
    wherein said logic module further comprises:
    a frame synchronizer, connected to said data extractor;
    wherein said data extractor extracts said tonal data by digitizing the tonal data into binary values, detecting bit clocks inscribed therein, and then transmitting said bit clocks to said frame synchronizer, which works in conjunction with a clock divider, a demodulator, and a signal processor to effectuate an audible playback of said tonal data.

2. The player of claim 1, further comprising:
    a user console having a plurality of manually operatable pitch control buttons.

3. The player of claim 2, wherein said console further comprises:
    visual and button options that allow a user to change tunings, such as up or down one half-step, one whole-step, or one octave.

4. The player of claim 1, wherein said logic module further comprises:
    a system controller such as a microprocessor or CPU.

5. The player of claim 1, wherein said frame synchronizer detects a frame synchronization signal from the data extractor and outputs the data being cut off at every frame to the demodulator, using a detected frame signal.

6. The player of claim 1, wherein said data extractor obtains said bit clock information using a PLL.

7. The player of claim 6, wherein said PLL further comprises:
    a reference clock input, for receiving a clock signal having a desired frequency;
    a data input connected to a phase comparator, which is in turn connected to a voltage controlled oscillator for converting voltage into a frequency, which is in turn connected to a loop filter for removing unwanted phase-shifted portions of an input signal;
    wherein said loop filter is in turn connected to an output, wherein said output is re-routed back into said input resulting in an output signal which has the desired frequency of the reference clock input.

8. The player of claim 6, wherein said PLL further comprises:
    a reference clock input, for receiving a clock signal having a desired frequency;

a data input connected to a high-speed phase comparator, which in turn is connected to a charge pump to act as an amplifier;

a filter for removing signal noise, connected to the output of said charge pump;

a voltage controlled oscillator connected to the output of said charge pump, for converting voltage into a frequency;

a feedback divider connected between said input and an output;

wherein said phase comparator compares said input signal to a feedback signal from the feedback divider, wherein depending on the phase difference between the input and reference clocks, the phase comparator drives the charge pump, the output of which is used to drive the voltage controlled oscillator;

wherein said voltage controlled oscillator receives a voltage and then outputs a signal with a frequency proportional to that voltage, wherein the output of said voltage controlled oscillator is fed back through a feedback divider to the phase comparator;

wherein said voltage controlled oscillator is in turn connected to an output, wherein said output is re-routed back into said input through said feedback divider resulting in an output signal which has the desired frequency of the reference clock input.

9. The player of claim 6, wherein said PLL further comprises:

a reference clock input, for receiving a clock signal having a desired frequency;

a data input connected to a phase compare for detecting a phase difference between a reference clock and the clock of a signal received at said input, wherein said phase compare outputs a phase difference signal representative of the phase difference between these reference and input clocks;

a charge pump and low pass filter block, connected to said phase compare and which receive said phase difference and convert the digital phase difference signal into an analog phase difference signal through a digital/analog converter and is then fed through a low pass filter to filter out high frequency noise; and a voltage controlled oscillator, connected to the output of said filter, for converting a voltage into a frequency.

10. The player of claim 9, wherein said PLL further comprises:

a self-sweeping autolock sub-circuit, connected at the input and output of said low pass filter, wherein a filtered analog phase difference signal is output from the charge pump and low pass filter in a feed-back loop to said voltage-controlled oscillator;

and further wherein if a phase difference signal is lost or unrecoverable, the self-sweeping autolock sub-circuit can scan a wide spectrum of frequencies and thereby assist said PLL in re-establishing an output frequency.

11. The player of claim 1, wherein said media comprises CDs.

12. The player of claim 1, wherein said media comprises .MP3 files.

13. The player of claim 1, wherein said logic module is implemented entirely in software.

14. The player of claim 13, further comprising:

a software PLL comprising a summation counter which has a read module to periodically read a value from a plurality of phase counters, and a comparison module to compare a current summation counter value to a most recent of a plurality of previously-stored summation counter values.

15. The player of claim 14, wherein said software PLL further comprises:

an error detector connected to said summation counter to disable further summation counter reading if the reference clock signal is lost; and a fallback register for storing said most recent summation counter value.

16. A method of operating a software PLL employed within a media player which permits user-selectable pitch control, comprising:

receiving a input clock signal;

splitting said input clock signal into a plurality of phases;

counting the rising and the falling edges of each of the phases;

storing each of said counts within its own counter;

latching a reference clock at a predetermined interval;

latching counter information summation counter;

summing said latched counter information thereby indicating the number of edges in a predetermined time period between latches of the reference clock;

reading said number of edges in a predetermined time period by a CPU;

comparing a newest counter value from said summation counter with a secondmost recent counter value; and if the newest counter value is greater than the secondmost recent counter value, slowing an output clock; or if the newest counter value is less than the secondmost recent counter value, speeding an output clock.

\* \* \* \* \*